United States Patent
Suslov et al.

(10) Patent No.: US 11,232,086 B2
(45) Date of Patent: Jan. 25, 2022

(54) PREVENTING AND RECOVERING FROM DUPLICATION IN A CONFIGURATION MANAGEMENT DATABASE

(71) Applicant: ServiceNow, Inc., Santa Clara, CA (US)

(72) Inventors: Leonid Suslov, Tel Aviv (IL); Arik Sityon, Ganney Tikva (IL); Rotem Steuer, Modin (IL); Shlomo Sividya, Ganei Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 321 days.

(21) Appl. No.: 16/401,968

(22) Filed: May 2, 2019

(65) Prior Publication Data

US 2020/0349131 A1 Nov. 5, 2020

(51) Int. Cl.
*G06F 16/215* (2019.01)
*H04L 12/24* (2006.01)

(52) U.S. Cl.
CPC ........ *G06F 16/215* (2019.01); *H04L 41/0853* (2013.01); *H04L 41/0856* (2013.01)

(58) Field of Classification Search
CPC ............... G06F 16/215; H04L 41/0856; H04L 41/0853; H04L 41/0873
USPC ....................................................... 707/692
See application file for complete search history.

(56) References Cited

U.S. PATENT DOCUMENTS

| | | | |
|---|---|---|---|
| 5,978,594 A | 11/1999 | Bonnell | |
| 6,321,229 B1 | 11/2001 | Goldman | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,350,209 B2 | 3/2008 | Shum | |
| 7,392,300 B2 | 6/2008 | Anantharangachar | |
| 7,617,073 B2 | 11/2009 | Trinon | |
| 7,685,167 B2 | 3/2010 | Mueller | |
| 7,716,353 B2 | 5/2010 | Golovinsky | |

(Continued)

OTHER PUBLICATIONS

"Duplicate CIs" webpage (obtained on Apr. 23, 2019 from https://docs.servicenow.com/bundle/london-servicenow-platform/page/product/configuration-management/concept/de-duplication-tasks.html).

*Primary Examiner* — Hicham Skhoun
(74) *Attorney, Agent, or Firm* — Fletcher Yoder PC

(57) ABSTRACT

A software application may have access to: (i) an identification condition that indicates a first subset of configuration-element attributes that can be used to identify configuration elements, and (ii) an exception indicating a second subset of the attributes that a module does not support. The software application may be configured to: based on the identification condition and the exception, search representations of configuration elements in a persistent storage in attempt to find a matching representation that characterizes information from the module, where the matching representation is found when one of the representations and the information from the module contain identical values for all of the attributes in the first subset excluding those also in the second subset; based on the search, determine that the matching representation is not found; and write, to the persistent storage, a new representation specifying values for attribute(s) according to the information from the module.

20 Claims, 11 Drawing Sheets

(56) References Cited

U.S. PATENT DOCUMENTS

| | | |
|---|---|---|
| 7,769,718 B2 | 8/2010 | Murley |
| 7,877,783 B1 | 1/2011 | Cline |
| 7,890,802 B2 | 2/2011 | Gerber |
| 7,925,981 B2 | 4/2011 | Pourheidari |
| 7,933,927 B2 | 4/2011 | Dee |
| 7,941,506 B2 | 5/2011 | Bonal |
| 7,945,860 B2 | 5/2011 | Vambenepe |
| 8,082,222 B2 | 12/2011 | Rangarajan |
| 8,346,752 B2 | 1/2013 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 2009/0094695 A1* | 4/2009 | Bansal ............... H04L 41/0856 726/21 |
| 2009/0187596 A1* | 7/2009 | Akiyama ........... G06F 9/44505 |
| 2014/0195504 A1* | 7/2014 | Morozov ............ G06F 16/2365 707/694 |
| 2014/0280268 A1* | 9/2014 | Mckay .................. H04L 67/34 707/758 |

\* cited by examiner

```
┌─────────────────────────────────────────────────────────────────────┐
│ BASED ON AN IDENTIFICATION CONDITION AND AN EXCEPTION, SEARCH, BY A SOFTWARE │
│ APPLICATION, REPRESENTATIONS OF CONFIGURATION ELEMENTS IN A PERSISTENT STORAGE│
│ IN ATTEMPT TO FIND A MATCHING REPRESENTATION THAT ALSO CHARACTERIZES A        │
│ PARTICULAR REPRESENTATION, WHERE THE REPRESENTATIONS ARE OF CONFIGURATION     │
│ ELEMENTS DISCOVERED WITHIN A MANAGED NETWORK, WHERE EACH OF THE               │
│ REPRESENTATIONS RESPECTIVELY SPECIFIES VALUES FOR AT LEAST SOME OF A SET OF   │
│ CONFIGURATION-ELEMENT ATTRIBUTES, WHERE THE REPRESENTATIONS INCLUDE THE       │
│ PARTICULAR REPRESENTATION, WHERE THE PARTICULAR REPRESENTATION SPECIFIES      │
│ VALUES ACCORDING TO INFORMATION RECEIVED FROM A MODULE ASSOCIATED WITH A      │
│ COMPUTING DEVICE DISPOSED WITHIN THE MANAGED NETWORK, THE INFORMATION         │  ← 1000
│ RECEIVED FROM THE MODULE REPRESENTING A PART OF A CONFIGURATION OF THE        │
│ COMPUTING DEVICE, WHERE THE SOFTWARE APPLICATION HAS ACCESS TO DEFINITIONS OF │
│ THE IDENTIFICATION CONDITION AND THE EXCEPTION, WHERE THE IDENTIFICATION CONDITION│
│ INDICATES A FIRST SUBSET OF THE CONFIGURATION-ELEMENT ATTRIBUTES THAT CAN BE  │
│ USED TO IDENTIFY CONFIGURATION ELEMENTS, WHERE THE EXCEPTION INDICATING A     │
│ SECOND SUBSET OF THE CONFIGURATION-ELEMENT ATTRIBUTES THAT THE MODULE DOES    │
│ NOT SUPPORT, AND WHERE THE MATCHING REPRESENTATION IS FOUND WHEN ONE OF THE   │
│ REPRESENTATIONS AND THE INFORMATION FROM THE MODULE CONTAIN IDENTICAL VALUES  │
│ FOR ALL OF THE CONFIGURATION-ELEMENT ATTRIBUTES IN THE FIRST SUBSET EXCLUDING │
│ THOSE ALSO IN THE SECOND SUBSET                                               │
└─────────────────────────────────────────────────────────────────────┘
                                    │
                                    ▼
┌─────────────────────────────────────────────────────────────────────┐
│ BASED ON THE SEARCH, DETERMINE, BY THE SOFTWARE APPLICATION, THAT THE MATCHING│ ← 1002
│                       REPRESENTATION IS FOUND                                 │
└─────────────────────────────────────────────────────────────────────┘
                                    │
                                    ▼
┌─────────────────────────────────────────────────────────────────────┐
│ MERGE, BY THE SOFTWARE APPLICATION, THE PARTICULAR REPRESENTATION AND THE     │
│ MATCHING REPRESENTATION INTO A COMBINED REPRESENTATION IN THE PERSISTENT      │ ← 1004
│ STORAGE, WHEREIN THE COMBINED REPRESENTATION SPECIFIES (I) AT LEAST SOME OF THE│
│ VALUES THAT WERE SPECIFIED IN THE MATCHING REPRESENTATION AND (II) AT LEAST SOME│
│        OF THE VALUES THAT WERE SPECIFIED IN THE PARTICULAR REPRESENTATION     │
└─────────────────────────────────────────────────────────────────────┘
```

FIG. 10

PREVENTING AND RECOVERING FROM DUPLICATION IN A CONFIGURATION MANAGEMENT DATABASE

BACKGROUND

In practice, management of an enterprise's network may involve gathering information regarding the configuration and operational aspects of the network. For instance, the enterprise might have multiple tools with which to facilitate discovery of devices, applications, and/or services on its own network. Such discovery may involve learning that certain devices, applications, and/or services are on the network as a general matter and/or may involve gathering other information about those devices, applications, and/or services.

Although use of multiple discovery-related tools could help an enterprise gather an extensive amount of valuable information, some of that information might end up being duplicative or otherwise redundant, which could lead to various issues. For example, duplicative information might unnecessarily take up valuable computational resources, such as processing resources and/or storage space on a data storage device. Further, the enterprise might need to dedicate extensive time and resources to ascertain whether certain information is duplicative and perhaps to reorganize and/or modify certain information, so as to recover from such duplication. Therefore, technical tools for preventing and/or recovering from such duplication could provide various benefits to enterprises.

SUMMARY

An enterprise might rely on a remote network management platform to manage the enterprise's network. The platform could facilitate a discovery procedure that does not rely on deployment of specialized software on device(s). Rather, the discovery procedure could involve use of remote access protocols and/or standards (e.g., Simple Network Management Protocol (SNMP)), so as to discover and/or obtain information about configuration item(s), such as devices, applications, and/or services on the managed network. Such configuration items could also be referred to herein as configuration elements, or the like.

Through this discovery procedure, the platform could write, to a configuration management database (CMDB), representations of configuration items that specify values according to obtained information. For example, each representation could respectively specify values for at least some of a set of configuration-item attributes (e.g., defined by the platform and/or by the enterprise). Those attributes might include a device name, a device identifier, a software name, a software type, a serial number, location, operating system, and/or operating system version, among numerous other examples.

In some cases, the CMDB might be populated through the platform's discovery procedure as well as in other ways, such as by manual entry and/or by third-party entities (e.g., a third-party data source). Given that multiple entities might update the CMDB, two or more of these entities may respectively create separate representations for the same configuration item.

To help overcome such issues, the platform could be equipped with tools that can help prevent duplication of data in the CMDB.

For example, entities might write to an application programming interface (API) that uses identification rule(s) (also be referred to herein as identification condition(s)). The identification rule(s) could be used to uniquely identify configuration items and determine whether and how representations should be written to the CMDB. A given identification rule can specify a combination of configuration-item attributes that can be used to unambiguously distinguish a configuration item from other configuration items. Thus, when an entity provides information regarding a configuration item to the API, the API may apply the identification rule(s) to uniquely identify the configuration item and to determine whether a representation of this configuration item already exists in the CMDB. If the API determines that no such representation exists, then the API may write a representation of the configuration item to the CMDB. If the API determines that such a representation already exists, then the API might not write another such representation to the CMDB, so as to help prevent duplication.

Although these tools are beneficial, they might not be able to prevent duplication of data in certain situations. For example, a third-party entity that populates or otherwise provide information for the CMDB could be a module (e.g., a software agent) deployed on computing device(s) of the enterprise's network. In some cases, such a module might not support certain configuration-item attribute(s), because the module might not be configured to determine and/or provide value(s) respectively for such attribute(s). Yet, identification rule(s) might respectively specify one or more of the attributes that the module does not support, among other attribute(s). Given this, if the module provides information about a configuration item to the API and the API then applies an identification rule in attempt to uniquely identify the configuration item, the API might not be able to do so because the module did not provide value(s) for certain attribute(s) specified by the identification rule. As a result, the API might inadvertently write, to the CMDB, a duplicative representation of the configuration item that contains values according to the information provided by the module.

Disclosed herein is an approach that could help prevent and/or recover from duplication that might occur due to the above-described situation in which the platform receives information from a module or some other source. This approach might leverage knowledge about the module's limitation(s), including the module's lack of support for certain configuration-item attributes.

According to the disclosed approach, the software application could have access to a definition of an exception associated with such a module. The exception might indicate one or more configuration-item attributes that the module does not support. As described in more detail below, the software application could apply the exception in combination with an identification rule in order to uniquely identify a configuration item based on information from the module, even though the module does not support certain attribute(s). Because the software application could so, the software application could prevent creation, in the CMDB, of a duplicate representation of this configuration item and/or could recover from such duplication.

For example, the software application could apply the identification rule in combination with the exception to determine whether a "matching" representation in the CMDB characterizes information from the module. The software application might find such a matching representation if one of the representations in the CMDB and the information from the module contain identical values for all of the attributes indicated by the identification rule excluding those also indicated by the exception. In a more specific example, the identification rule could indicate device identifier, software name, and software type as attributes for uniquely identifying a particular class of configuration items, and the exception could indicate software type as an attribute that the module does not support (and possibly other attribute(s) as well). Therefore, the software application would use just the device identifier and software name (i.e., excluding the software type) as basis for finding a matching representation in the CMDB.

Accordingly, if the software application receives information from the module and does not find a matching representation as described, then the software application might create a new representation in the CMDB according to the information form the module. On the other hand, if the software application does find a matching representation, then the software application might not create a new representation in the CMDB according to the information form the module, thereby helping to prevent duplication.

In an alternative embodiment, if the CMDB contains a particular representation that includes information from the module and the software application does not find a matching representation (e.g., that characterizes or is otherwise a duplicate of the particular representation), then the software application might maintain the particular representation in the CMDB. On the other hand, if the software application does find a matching representation, then the software application might merge the particular representation with the matching representation, thereby helping to recover from duplication. Other advantages are also possible.

Accordingly, a first example embodiment may involve a computing system that includes persistent storage and a software application. The persistent storage may contain representations of configuration elements discovered within a managed network, where each of the representations respectively specifies values for at least some of a set of configuration-element attributes, and where a module is associated with a computing device disposed within the managed network. Also, the software application may have access to definitions of: (i) an identification condition that indicates a first subset of the configuration-element attributes that can be used to identify configuration elements, and (ii) an exception indicating a second subset of the configuration-element attributes that the module does not support.

Given this, the software application may be configured to: receive, from the module, information that represents a part of a configuration of the computing device; based on the identification condition and the exception, search the representations of configuration elements in the persistent storage in attempt to find a matching representation that characterizes the information from the module, where the matching representation is found when one of the representations and the information from the module contain identical values for all of the configuration-element attributes in the first subset excluding those also in the second subset; based on the search, determine that the matching representation is not found; and write, to the persistent storage, a new representation of a configuration element, where the new representation specifies values for at least some of the configuration-element attributes of the set according to the information from the module.

Further, a second example embodiment may involve receiving, by a software application and from a module, information that represents a part of a configuration of a computing device disposed within a managed network, wherein the module is associated with the computing device, where the software application is part of a computing system including persistent storage that contains representations of configuration elements discovered within the managed network, where each of the representations respectively specifies values for at least some of a set of configuration-element attributes, and wherein the software application has access to definitions of: (i) an identification condition that indicates a first subset of the configuration-element attributes that can be used to identify configuration elements, and (ii) an exception indicating a second subset of the configuration-element attributes that the module does not support.

The second example embodiment may also involve, based on the identification condition and the exception, searching, by the software application, the representations of configuration elements in the persistent storage in attempt to find a matching representation that characterizes the information from the module, where the matching representation is found when one of the representations and the information from the module contain identical values for all of the configuration-element attributes in the first subset excluding those also in the second subset. The second example embodiment may further involve, based on the search, determining, by the software application, that the matching representation is not found. The second example embodiment may yet further involve writing, by the software application and to the persistent storage, a new representation of a configuration element, where the new representation specifies values for at least some of the configuration-element attributes of the set according to the information from the module.

Yet further, a third example embodiment may involve a computing system that includes persistent storage and a software application. In this embodiment, the persistent storage may contain representations of configuration elements discovered within a managed network, where each of the representations respectively specifies values for at least some of a set of configuration-element attributes, and where the representations include a particular representation that specifies values according to information received from a module associated with a computing device disposed within the managed network, the information received from the module representing a part of a configuration of the computing device. Here again, the software application may have access to definitions of: (i) an identification condition that indicates a first subset of the configuration-element attributes that can be used to identify configuration elements, and (ii) an exception indicating a second subset of the configuration-element attributes that the module does not support.

Given this, the software application may be configured to: based on the identification condition and the exception, search the representations of configuration elements in the persistent storage in attempt to find a matching representation that also characterizes the particular representation, where the matching representation is found when one of the representations and the information from the module contain identical values for all of the configuration-element attributes in the first subset excluding those also in the second subset; based on the search, determine that the matching representation is found; and merge the particular representation and the matching representation into a combined representation in the persistent storage, where the combined representation specifies (i) at least some of the values that were specified in the matching representation and (ii) at least some of the values that were specified in the particular representation.

Yet further, a fourth example embodiment may involve, based on an identification condition and an exception, searching, by a software application, representations of configuration elements in a persistent storage in attempt to find a matching representation that also characterizes a particular representation, where the representations are of configuration elements discovered within a managed network, where each of the representations respectively specifies values for at least some of a set of configuration-element attributes, where the representations include the particular representation, where the particular representation specifies values according to information received from a module associated with a computing device disposed within the managed network, the information received from the module representing a part of a configuration of the computing device, where the software application has access to definitions of the identification condition and the exception, where the identification condition indicates a first subset of the configuration-element attributes that can be used to identify configuration elements, where the exception indicating a second subset of the configuration-element attributes that the module does not support, and where the matching representation is found when one of the representations and the information from the module contain identical values for all of the configuration-element attributes in the first subset excluding those also in the second subset. The fourth example embodiment may also involve, based on the search, determining, by the software application, that the matching representation is found. The fourth example embodiment may further involve merging, by the software application, the particular representation and the matching representation into a combined representation in the persistent storage, where the combined representation specifies (i) at least some of the values that were specified in the matching representation and (ii) at least some of the values that were specified in the particular representation.

In a fifth example embodiment, an article of manufacture may include a non-transitory computer-readable medium, having stored thereon program instructions that, upon execution by a computing system, cause the computing system to perform operations in accordance with the first, second, third, and/or fourth example embodiments.

In a sixth example embodiment, a computing system may include at least one processor, as well as memory and program instructions. The program instructions may be stored in the memory, and upon execution by the at least one processor, cause the computing system to perform operations in accordance with the first, second, third, and/or fourth example embodiments.

In a seventh example embodiment, a system may include various means for carrying out each of the operations of the first, second, third, and/or fourth example embodiments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 10 is a flow chart illustrating another method, in accordance with example embodiments.

DETAILED DESCRIPTION

Figure 1:
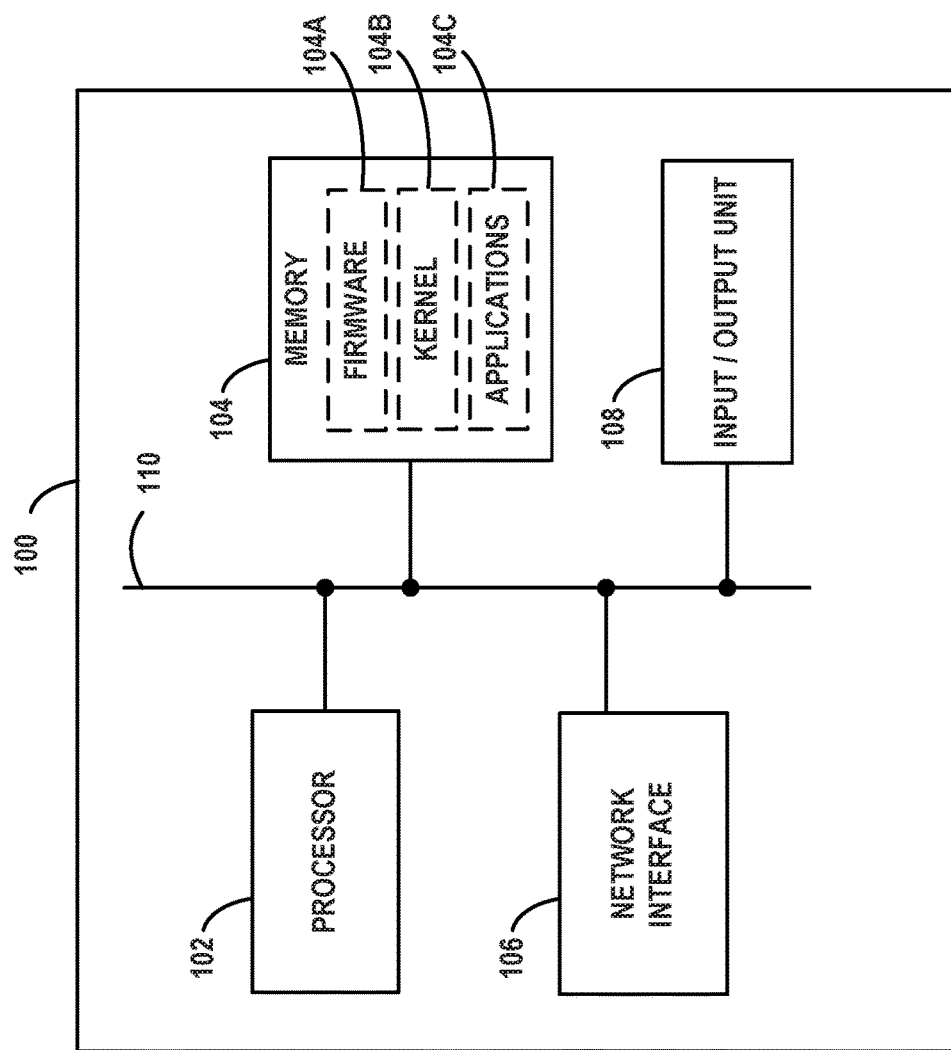
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
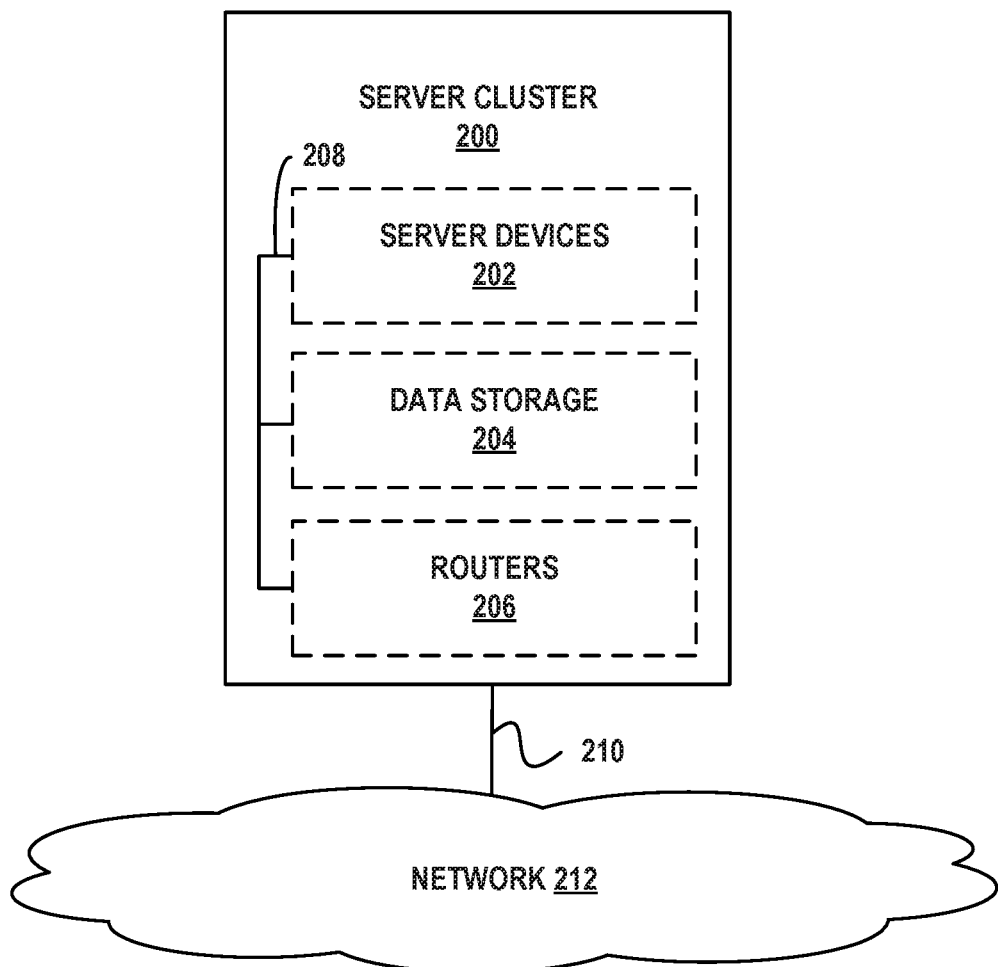
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
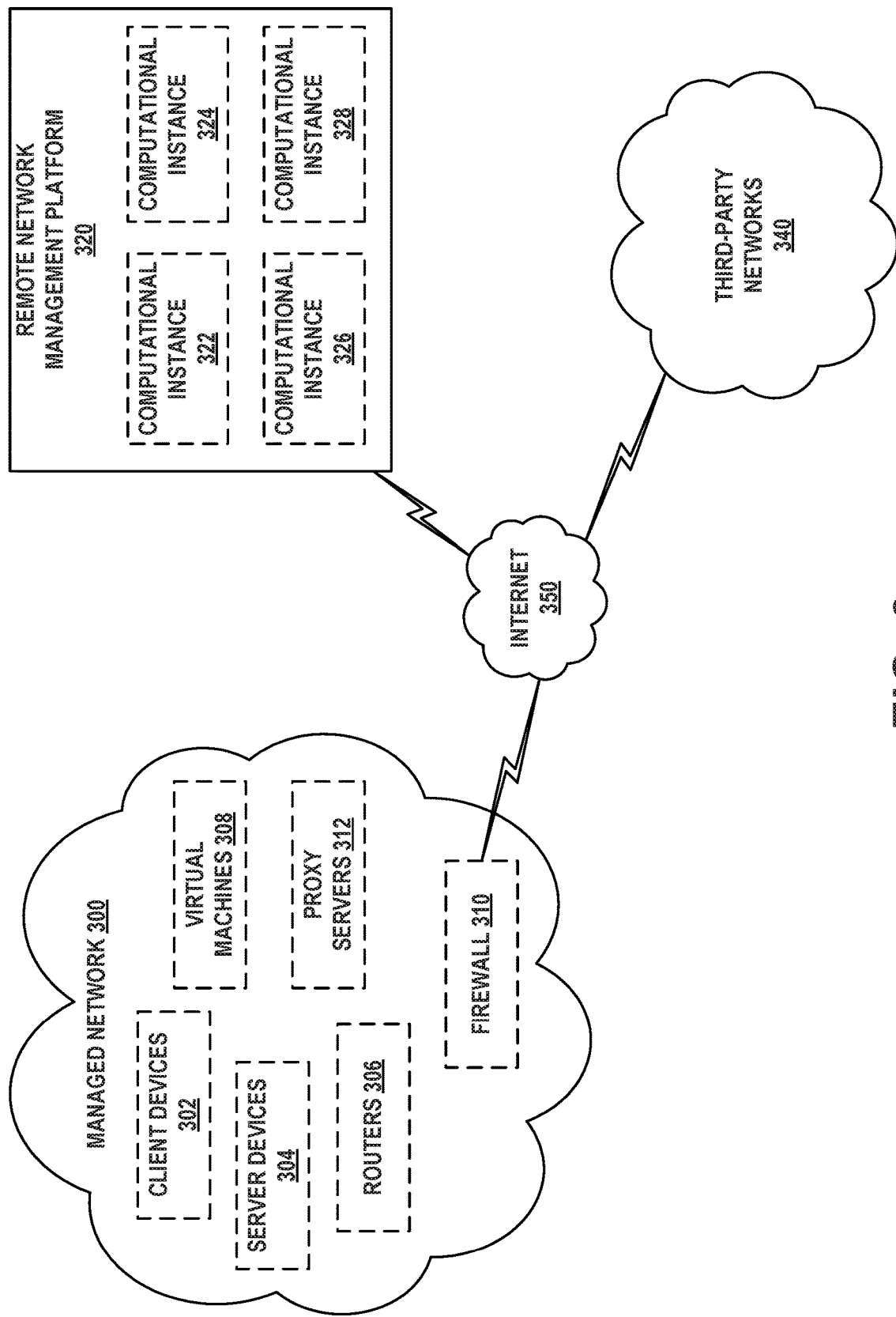
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
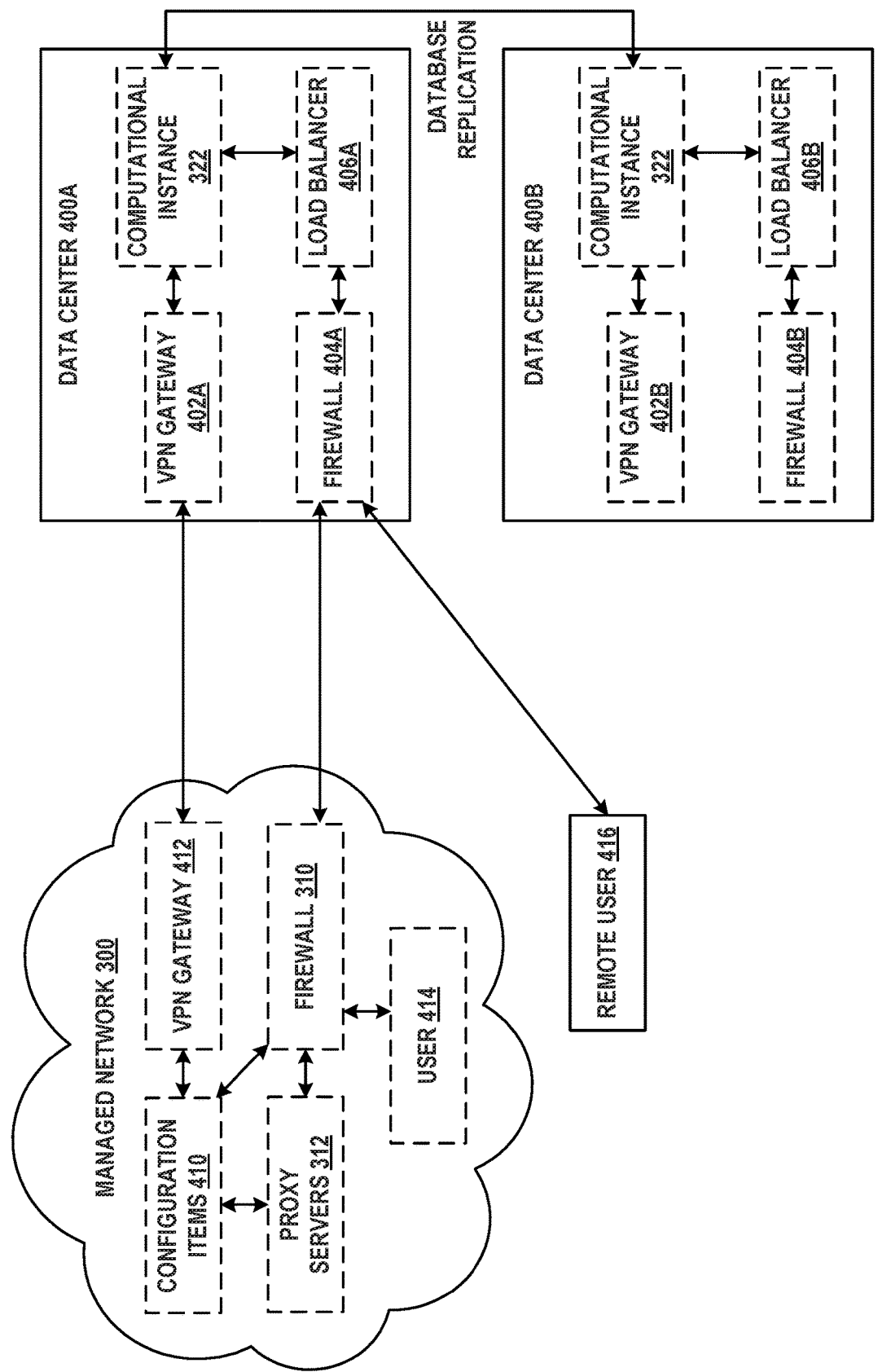
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
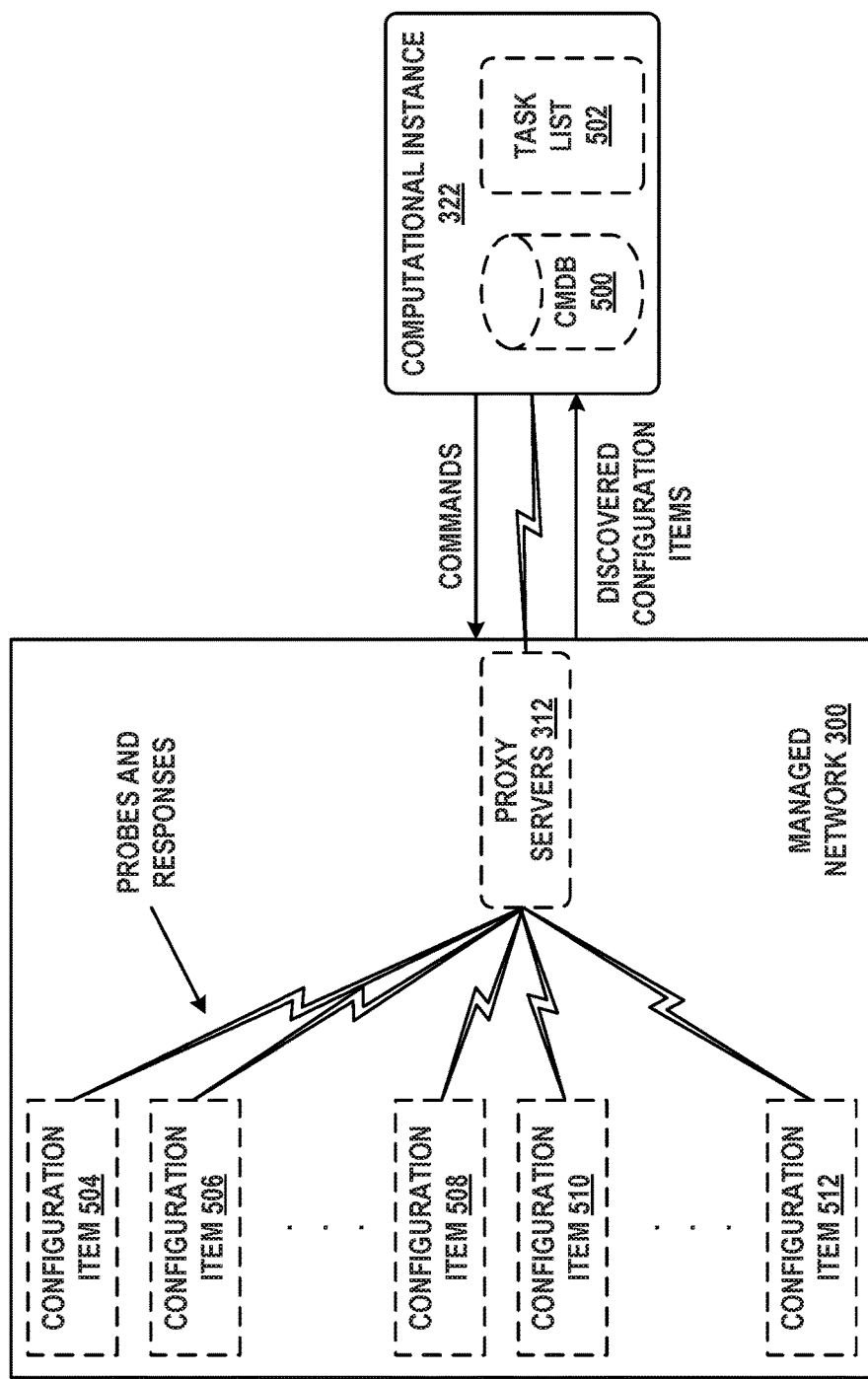
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
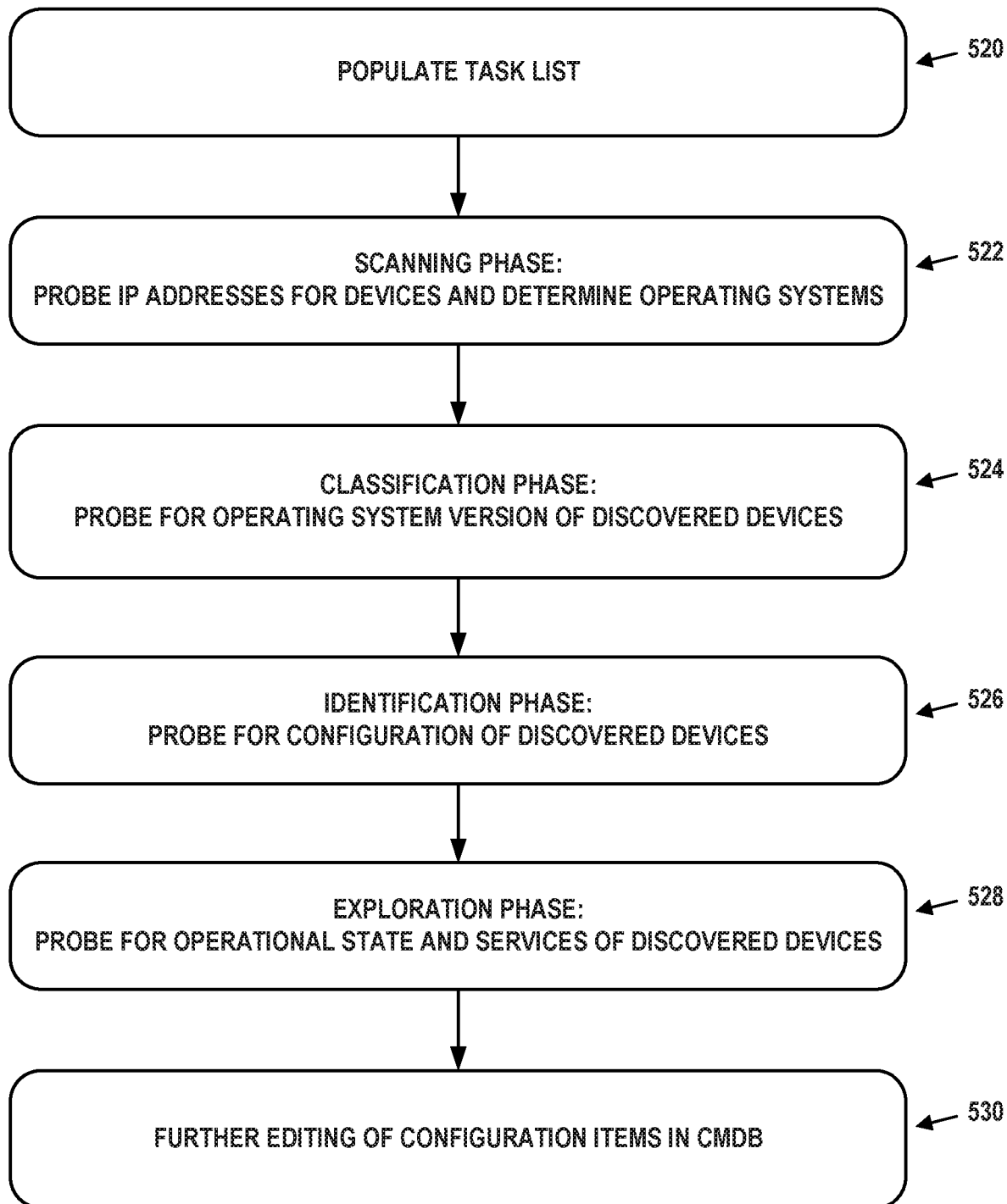
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. PREVENTING AND RECOVERING FROM DUPLICATION IN A CMDB

Disclosed herein is an approach that could help prevent and/or recover from duplication of data in a CMDB that might occur due the CMDB being populated based on information from a module having limitation(s), such as lack of support for certain configuration-item attributes. By helping to prevent and/or recover from duplication of data in the above-mentioned situation, the disclosed approach could provide for numerous benefits. For example, the disclosed approach could help save valuable computational resources of a managed network, such as processing resources and/or storage space on a data storage device. In another example, the disclosed approach could help minimize situations in which an enterprise dedicates extensive time and resources to ascertain whether certain data in the CMDB is duplicative and/or to reorganize/modify such data, to recover from duplication. Other examples are also possible.

Figure 6:
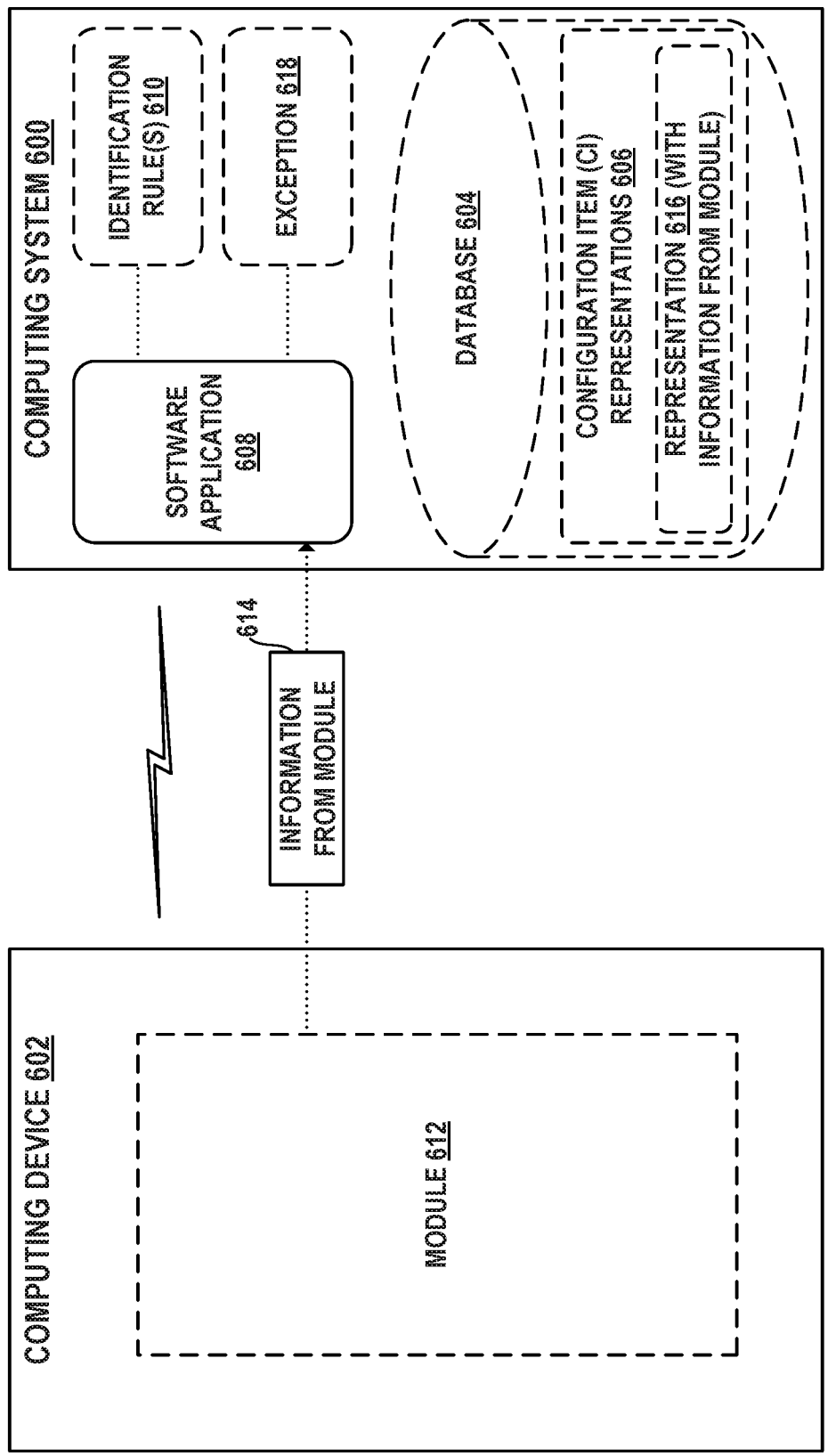
FIG. 6 depicts communication between a computing system and a computing device, in accordance with example embodiments.

FIG. 6 illustrates features, components, and/or operations of a computing system 600 and of a computing device 602. Although FIG. 6 illustrates a specific arrangement, operations disclosed herein may be carried out in the context of similar and/or other arrangement(s) as well without departing from the scope of the present disclosure.

The computing system 600 could include features and/or components of a managed network and/or of a remote network management platform that supports remote management of the managed network.

In particular, the computing system 600 may include a database 604. The database 604 could take the form of or could otherwise be referred to herein as persistent storage, among other possibilities. Moreover, this database 604 could be a CMDB of a computational instance, such as CMDB 500 for example. Therefore, the database 604 could include representations 606 of configuration items that were discovered on a managed network.

Also, computing system 600 may include server device(s) (not shown). The server device(s) may contain or may otherwise have access to program instructions executable by processor(s), so as to cause the computing system 600 to carry out various operations described herein. On this point, the server device(s) may include server device(s) disposed within a computational instance of a remote network management platform, such as within computational instance 322. Additionally or alternatively, the server device(s) may include server device(s) disposed within the managed network 300 (e.g., proxy server 312). In any case, a software application 608 could be deployed on such server device(s), so as to help facilitate aspects of the present disclosure. In practice, the software application 608 could be integrated with or could communicate with the above-described identification and reconciliation API and/or could take on various other forms.

Software application 608 could have access to or otherwise be configured with definition(s) of identification rule(s) 610, such as of the above-described identification rules. As discussed, each such identification rule could indicate a respective combination of configuration-item attributes that can be used to uniquely identify configuration items. Also, the identification rule(s) 610 could have respective priorities. Given this, the software application 608 could apply the highest priority identification rule in attempt to identify a configuration item. If the software application 608 cannot successfully identify a configuration item by applying the highest priority identification rule, the software application 608 could then apply the second highest priority identification rule in attempt to identify a configuration item, and so on. In this way, the software application 608 could apply identification rule(s) 610 in order of their priorities until the software application 608 identifies a configuration item using one of the rule(s) 610 or completes application of the rule(s) 610 without identifying a configuration item.

Further, computing device 602 may include feature(s) and/or components of computing device 100, and could be one of the client devices 302 of the managed network 300, for example. Generally, the computing device 602 could engage in communication(s) with computing system 600, such as via wired and/or wireless communication link(s). Moreover, as shown, the computing device 602 may have a module 612 deployed thereon. Generally, computing system 600 (e.g., software application 608) could communicate with the module 612 by way of a proxy server (e.g., proxy server 312), among other possibilities.

In the present disclosure, the module 612 could take various forms. In one example, the module 612 could be a software agent (e.g., Osquery, Chef, or Puppet®) configured to provide information related to the computing device 602, such as in response to a request for the information, for example. In another example, the module 612 could be a network monitoring tool that monitors a managed network for various issues and that can provide notifications related to such issues. In yet another example, the module 612 could be a computer program for managing virtual machines (e.g., VMWARE® vCenter), which could provide information related to such virtual machines. Numerous other examples are also possible.

Given this, the module 612 could be another tool that a remote network management platform uses to populate a CMDB, such in addition to the discovery procedure described above in association with FIGS. 5A-5B. For example, the remote network management platform could receive, from the module 612, information 614 related to at least a part of a configuration of the computing device 602, such as to a particular configuration item (e.g., particular software or hardware deployed on the computing device 602). In some cases, the remote network management platform could write, to the database 604, a representation 616 of this configuration item that includes values according to information from the module 612. In other cases, the representation 616 might already exist in the database 604, and the remote network management platform could update such an existing representation to include values according to information 614 from the module 612. Other cases are also possible.

Although module 612 could provide various benefits, in some situations, use of identification rule(s) 610 alone might not help identify a configuration item according to information from the module 612, which in turn could lead to duplication of data in the CMDB.

By way of example, module 612 might have certain limitation(s), as the module 612 might not be configured to determine and/or provide values for certain configuration-item attributes. Those and other attributes might be specified by an identification rule for uniquely identifying configuration item(s). And if the software application 608 applies this identification rule in attempt to identify a configuration item according to information 614 from the module 612, the software application 608 might not successfully identify the configuration item due to lack of values for certain attributes. Given this, the software application 608 might not recognize that a certain representation in the CMDB already characterizes the information 614 from the module or otherwise represents the configuration item at issue (e.g., a representation created in the CMDB during the above-described discovery procedure). Consequently, the software application 608 might inadvertently write, to the CMDB, a duplicative representation of the configuration item that contains values according to the information 614 provided by the module 612. Other examples are also possible.

According to the disclosed approach, the software application 608 could have access to or otherwise be configured with a definition of an exception 618 that leverages knowledge about the module 612's limitation(s). The exception 618 might indicate which configuration-item attributes the module 612 does not support. Therefore, the software application 608 could use the exception 618 to help prevent and/or recover from duplication as further described herein.

Although the present disclosure is described in the context of one such exception associated with a module, it should be understood that the software application could have definitions of such exceptions respectively for two or more modules.

In an example implementation, the software application 608 could apply the exception 618 to prevent duplication of data in the CMDB. Specifically, the software application 608 could apply the exception 618 in combination with a particular one of the identification rule(s) 610, so as to determine whether the CMDB already include a "matching" representation that characterizes information received from the module 612. The software application 608 could do so even if the particular identification rule indicates certain configuration-item attribute(s) that the module 612 does not support.

More specifically, the particular identification rule could indicate a first group of configuration-item attributes for uniquely identifying configuration items, and the exception 618 could indicate a second group of configuration-item attribute(s) that the module 612 does not support. Given this, if the software application 608 determines that one of the representations in the CMDB and the information from the module 612 have identical values for all attributes specified by the particular identification rule excluding those also specified by the exception 618, then the software application 608 could deem that representation to be the matching representation. However, if the software application 608 determines that none of the representations in the CMDB meets such criteria, then the software application 608 could determine that the matching representation is not found.

Accordingly, if the software application 608 does not find a matching representation as described, then the software application 608 might create a new representation in the CMDB according to the information from the module 612. Such a new representation might include one or more of the values specified by the information from module 612. On the other hand, if the software application 608 does find a matching representation, then the software application 608 might not create a new representation in the CMDB according to the information form the module 612, thereby helping to prevent duplication of data in the CMDB.

By way of example, the CMDB could include a particular representation that specifies "tomcat" as a software type attribute, "tomcat.exe" as a software name attribute, and "Linux Server on IP address 10.10.10.5" as a device identifier attribute. In this example, the particular identification rule could indicate the software type, software name, and device identifier attributes for uniquely identifying configuration items. And the exception 618 could indicate software type as an attribute that the module 612 does not support, perhaps because the module 612 is not configured to provide a specific value for that attribute. In some cases, the exception 618 could also indicate other attribute(s) that the module 612 does not support.

Given this, the software application 608 could receive, from the module 612, information that specifies "tomcat.exe" as a software name attribute and "Linux Server on IP address 10.10.10.5" as a device identifier attribute. Yet, the information from the module 612 might specify that the value of the software type attribute is unknown or might not specify any value at all.

In this situation, the software application 608 could apply the particular identification rule in combination with the exception 618, so as to determine that the particular representation in the CMDB and the information from the module 612 have identical values for all attributes specified by the particular identification rule excluding those also specified by the exception 618 (i.e., have identical values for the software name and device identifier attributes). As a result, the software application 608 could deem the particular representation as a matching representation that already characterizes the information from the module 612. And the software application 608 could therefore not write, to the CMDB, a new representation that specifies values according to the information from the module 612, thereby preventing duplication of data.

In contrast, if the CMDB does not include the particular representation at issue, then the software application 608 could apply the particular identification rule in combination with the exception 618, to determine that a matching representation is not found. And because the software application 608 determines that matching representation is not found, the software application 608 could responsively write, to the CMDB, a new configuration item representation that specifies values according to the information from the module 612, thereby beneficially utilizing the module 612 for discovery-related purposes. Other examples are also possible.

In another example implementation, the software application 608 could apply the exception 618 to help recover from duplication of data in the CMDB. In particular, the CMDB might include a "module-based" representation that specifies values according to information received from the module 612. Such a representation could include a digital mark or the like indicating that a source of the values specified by the representation is the module 612. Accordingly, the software application 608 could determine that the module-based representation includes the mark, and may responsively evaluate whether this representation is a duplicate of another representation in the CMDB, in line with the present disclosure. Advantageously, the software application 608 could carry out such an evaluation only for representations in the CMDB that include the mark, so as to prevent a time-consuming and computationally expensive evaluation of all or many of the representations in the CMDB.

More specifically, the software application 608 could apply the exception 618 in combination with a particular one of the identification rule(s) 610, so as to determine whether the CMDB already includes a "matching" representation that also characterizes the module-based representation (e.g., that includes information duplicative of the information included in the module-based representation). Here again, the software application 608 could do so even if the particular identification rule indicates certain configuration-item attribute(s) that the module 612 does not support.

Specifically, the particular identification rule could indicate a first group of configuration-item attributes for uniquely identifying configuration items, and the exception 618 could indicate a second group of configuration-item attribute(s) that the module 612 does not support, in line with the discussion above. Given this, if the software application 608 determines that one of the representations in the CMDB and the module-based representation have identical values for all attributes specified by the particular identification rule excluding those also specified by the exception 618, then the software application 608 could deem that one representation to be the matching representation. However, if the software application 608 determines that none of the representations in the CMDB meets such criteria, then the software application 608 could determine that the matching representation is not found.

Accordingly, if the software application 608 does not find a matching representation as described, then the software application 608 might maintain the module-based representation in the CMDB. On the other hand, if the software application 608 does find a matching representation, then the software application 608 might merge the module-based representation with the matching representation into a combined representation. Such a combined representation could specify at least some of the values that were specified in the matching representation, as well as at least some of the values that were specified in the module-based representation. For example, the software application 608 could apply a union operation with respect to the module-based representation and the matching representation, so as to merge those representations into the combined representation, among other possibilities. In this way, the software application 608 could utilize the exception 618 to help recover from duplication of data in the CMDB. Other advantages are also possible.

In some implementations, the disclosed approach could be incorporated as part of a more extensive process for preventing duplication of data in the CMDB and/or as part of a more extensive process for recovering from duplication of data in the CMDB.

Figure 7:
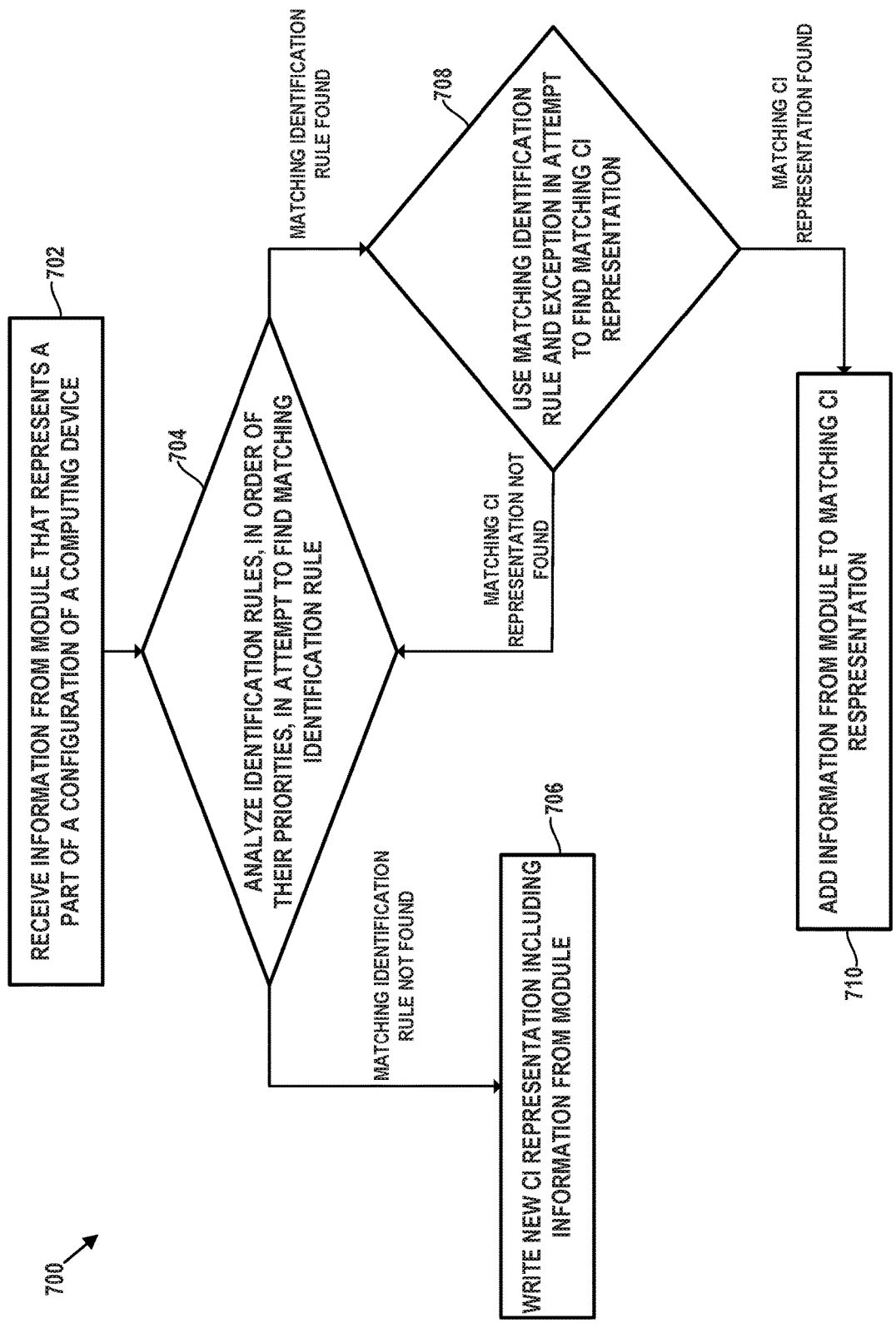
FIG. 7 is a flow diagram illustrating a process to prevent duplication, in accordance with example embodiments.

FIG. 7 is a flow diagram 700 illustrating a more extensive process for preventing duplication of data in the CMDB, in accordance with the present disclosure. Although the flow diagram 700 includes certain steps 702-710, it should be understood that embodiments of flow diagram 700 may be simplified by the removal of any one or more of the features shown therein. Further, these embodiments may be combined with features, aspects, and/or implementations of any of the previous figures or otherwise described herein.

At step 702, the software application 608 could receive information from the module 612. As described, this information could represent at least a part of a configuration of a computing device disposed within a managed network. After step 702, the software application 608 could proceed to step 704.

At step 704, the software application 608 could analyze the identification rule(s) 610, in order of their priorities, in attempt to find a matching identification rule that can be used in combination with the exception 618 so as to carry out a search for a matching configuration item representation. Such a matching identification rule is found when one of the identification rules indicates configuration-item attributes that include at least those associated with the information from the module 612. In other words, the information from the module 612 might contain values for a group of configuration-item attributes. And an identification rule would be considered a matching identification rule if it indicates attributes that include at least the attributes of the group (the matching identification rule could also indicate attribute(s) other than those of the group).

If the software application 608 does not find a matching identification rule, then the software application could proceed to step 706.

At step 706, the software application 608 could write, to the CMDB, a new representation of a configuration item, the new representation specifying values according to the information from the module 612.

However, if the software application 608 does find a matching identification rule, then the software application could proceed to step 708.

At step 708, the software application 608 could search the configuration item representations in the CMDB in attempt to find a matching representation that characterizes the information from the module 612. The software application 608 could do so as described herein, by applying the matching identification rule that was found in step 704 in combination with the exception 618.

If the software application 608 does not find a matching representation based on the search, the software application 608 could return to step 704. At that point, the software application 608 could continue analyzing the identification rule(s) 610, in order of their priorities, in attempt to find another matching identification rule that meets the criteria described above with respect to step 704. If the software application 608 does not find another matching identification rule during the continued analyzing, then the software application could proceed to step 706, so as to write a new representation to the CMDB as described. However, if the software application 608 does find another matching identification rule, then the software application 608 could apply this other "newly-found" matching identification rule in combination with the exception 618, to again search the representations in the CMDB in another attempt to find a matching representation that characterizes the information from the module 612, and so on.

If the software application 608 finds a matching representation based on the initial search or based on one of the subsequent searches associated with step 708, then the software application 608 could proceed to step 710.

At step 710, the software application 608 could write, in the CMDB and to the matching representation that was found at step 708, value(s) for configuration-item attributes according to the information from the module 612.

In this way, the process illustrated by flow diagram 700 could help prevent duplication of data in the CMDB, while helping to ensure that information from the module 612 is beneficially utilized for discovery-related purposes when applicable.

Figure 8:
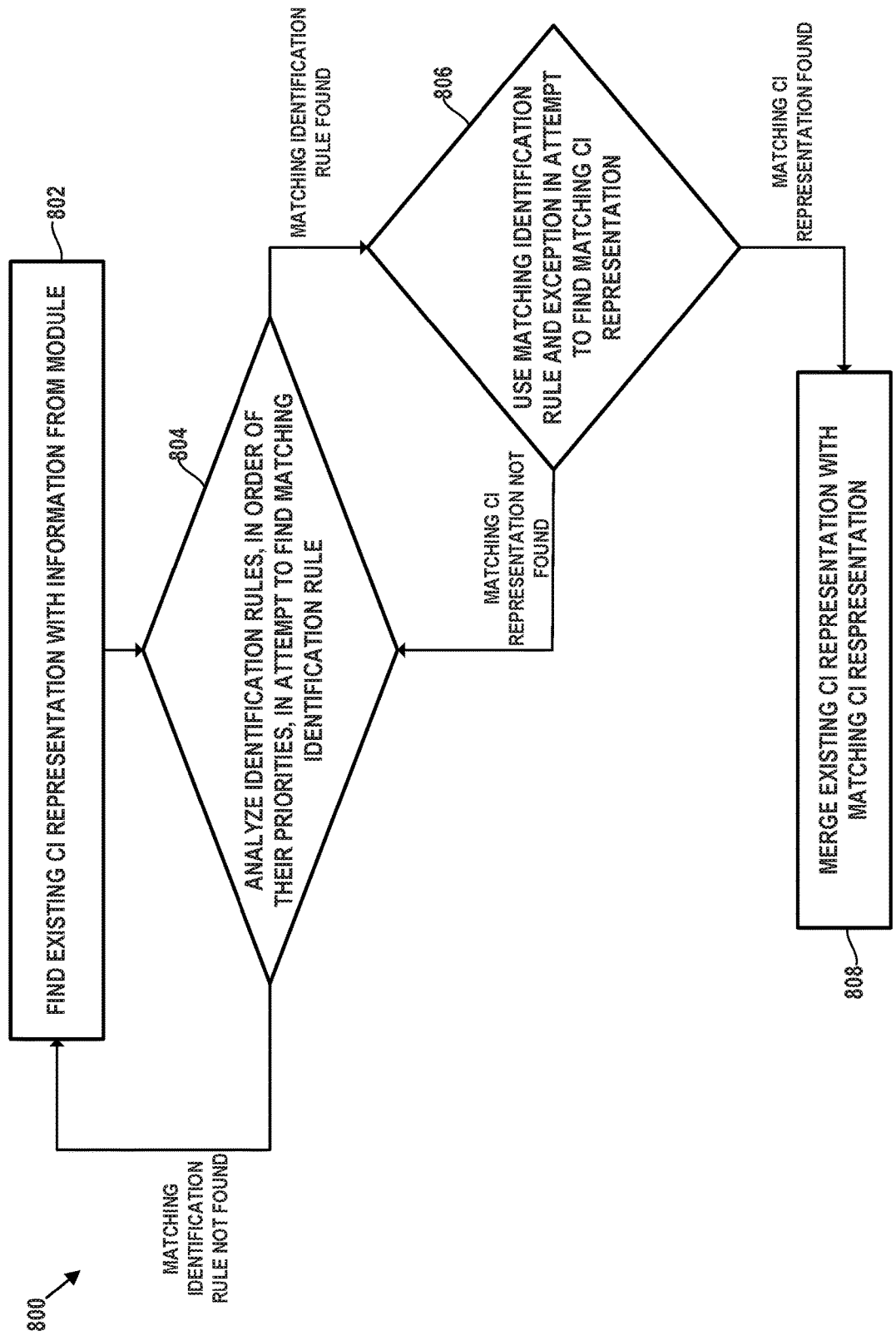
FIG. 8 is a flow diagram illustrating a process to recover from duplication, in accordance with example embodiments.

FIG. 8 is next a flow diagram 800 illustrating a more extensive process for recovering from duplication of data in the CMDB, in accordance with the present disclosure. Although the flow diagram 800 includes certain steps 802-808, it should be understood that embodiments of flow diagram 800 may be simplified by the removal of any one or more of the features shown therein. Further, these embodiments may be combined with features, aspects, and/or implementations of any of the previous figures or otherwise described herein.

At step 802, the software application 608 could review configuration item representations in the CMDB to find an existing representation that has the above-described mark, which indicates that a source of the values specified by that representation is the module 612. After step 802, the software application 608 could proceed to step 804.

At step 804, the software application 608 could analyze the identification rule(s) 610, in order of their priorities, in attempt to find a matching identification rule that can be used in combination with the exception 618 so as to carry out a search for a matching configuration item representation, as described herein in the context of recovering from duplication. Such a matching identification rule is found when one of the identification rules indicates configuration-item attributes that include at least those associated with the existing representation that was found at step 802. In other words, the existing representation might contain values (e.g., according to information from the module 612) for a group of configuration-item attributes. And an identification rule would be considered a matching identification rule if it indicates attributes that include at least the attributes of the group (the matching identification rule could also indicate attribute(s) other than those of the group).

If the software application 608 does not find a matching identification rule, then the software application could maintain the existing representation in the CMDB and return to step 802, to find another existing representation according to the above-described criteria. At that point, the software application 608 would carry out step(s) of flow diagram 800 in the context of this other "newly-found" existing representation as further described herein, and so on.

However, if the software application 608 does find a matching identification rule, then the software application could proceed to step 806.

At step 806, the software application 608 could search the configuration item representations in the CMDB in attempt to find a matching representation that also characterizes existing representation (e.g., that includes information duplicative of the information included in the existing representation). The software application 608 could do so as described herein, by applying the matching identification rule that was found in step 804 in combination with the exception 618.

If the software application 608 does not find a matching representation based on the search, the software application 608 could return to step 804. At that point, the software application 608 could continue analyzing the identification rule(s) 610, in order of their priorities, in attempt to find another matching identification rule that meets the criteria described above with respect to step 804. If the software application 608 does not find another matching identification rule during the continued analyzing, then the software application could maintain the existing representation in the CMDB and return to step 802, so as to find another existing representation according to the above-described criteria. However, if the software application 608 does find another matching identification rule, then the software application 608 could apply this other "newly-found" matching identification rule in combination with the exception 618, to again search the configuration item representations in the CMDB in another attempt to find a matching representation that also characterizes existing representation, and so on.

If the software application 608 finds a matching representation based on the initial search or based on one of the subsequent searches associated with step 806, then the software application 608 could proceed to step 808.

At step 808, the software application 608 could merge the existing representation and the matching representation that was found at step 806 into a combined representation in the CMDB. This combined representation could specify (i) at least some of the values that were specified in the matching representation and (ii) at least some of the values that were specified in the existing representation.

After completion of step 808, the software application 608 could optionally return to step 802, so as to find another existing representation according to the above-described criteria and then carry out the process of flow diagram 800 with respect to this other existing representation. Given this, the software application 608 could carry out the process of flow diagram 800 with respect to some or all of the configuration item representation in the CMDB that have the above-described mark. In this way, the process of flow diagram 800 could help to recover from data duplication that might occur due to creation of representation(s) in the CMDB according to information from a module that has certain limitations.

VII. EXAMPLE OPERATIONS

Figure 9:
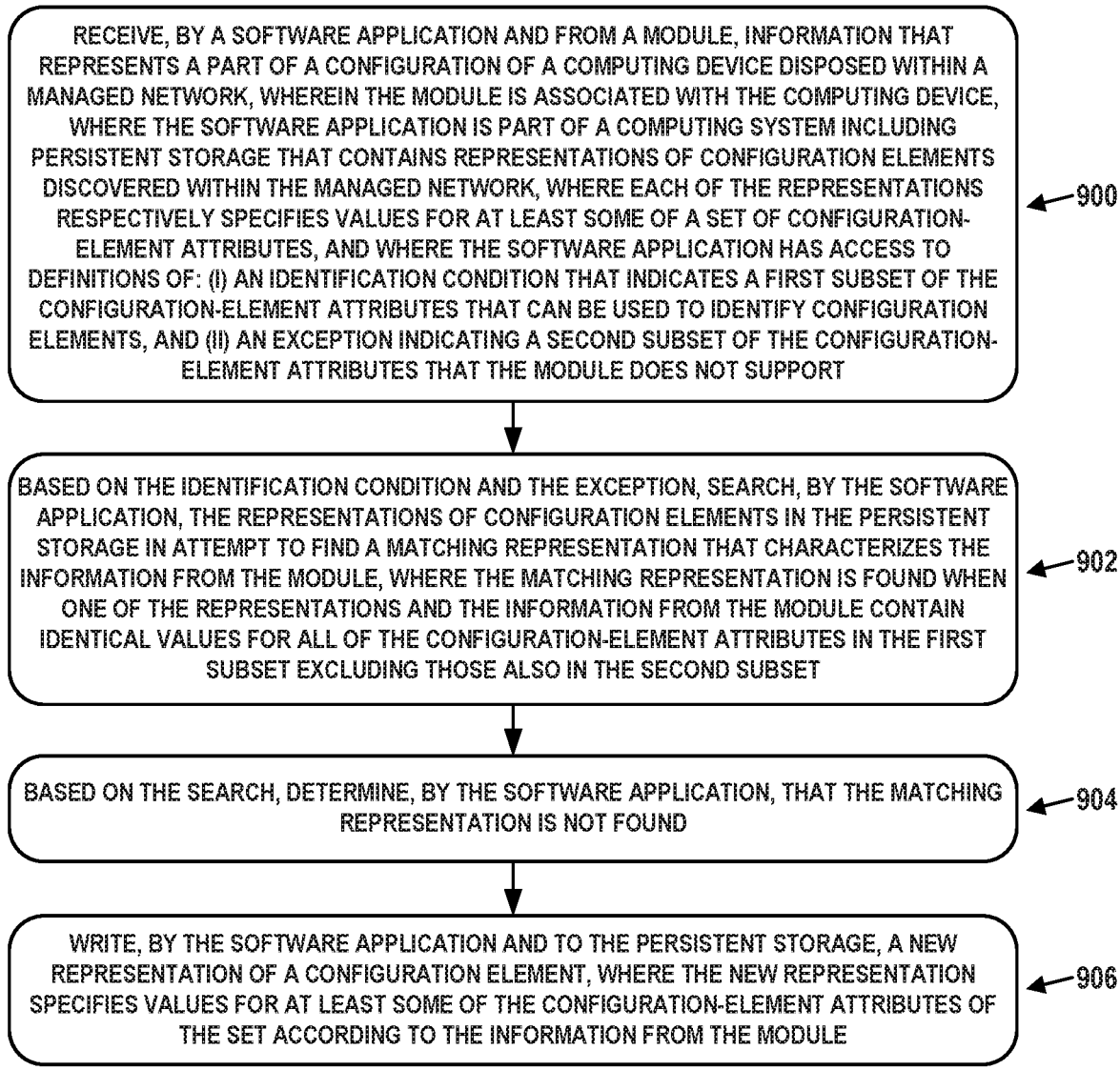
FIG. 9 is a flow chart illustrating a method, in accordance with example embodiments.

FIG. 9 is a flow chart illustrating an example embodiment. The process illustrated by FIG. 9 may be carried out by a computing system, such as computing device 100, and/or a cluster of computing devices, such as server cluster 200. However, the process can be carried out by other types of devices or device subsystems. For example, the process could be carried out by a portable computer, such as a laptop or a tablet device. In another example, the process could be carried out by any system or device that executes or otherwise has software application 608 deployed thereon.

The embodiments of FIG. 9 may be simplified by the removal of any one or more of the features shown therein. Further, these embodiments may be combined with features, aspects, and/or implementations of any of the previous figures or otherwise described herein.

Block 900 may involve receiving, by a software application and from a module, information that represents a part of a configuration of a computing device disposed within a managed network, where the module is associated with the computing device, where the software application is part of a computing system including persistent storage that contains representations of configuration elements discovered within the managed network, where each of the representations respectively specifies values for at least some of a set of configuration-element attributes, and where the software application has access to definitions of: (i) an identification condition that indicates a first subset of the configuration-element attributes that can be used to identify configuration elements, and (ii) an exception indicating a second subset of the configuration-element attributes that the module does not support.

Block 902 may involve, based on the identification condition and the exception, searching, by the software application, the representations of configuration elements in the persistent storage in attempt to find a matching representation that characterizes the information from the module, where the matching representation is found when one of the representations and the information from the module contain identical values for all of the configuration-element attributes in the first subset excluding those also in the second subset.

Block 904 may involve, based on the search, determining, by the software application, that the matching representation is not found.

Block 906 may involve writing, by the software application and to the persistent storage, a new representation of a configuration element, where the new representation specifies values for at least some of the configuration-element attributes of the set according to the information from the module.

In some embodiments, the module may be a software agent, a network monitoring tool, or a computer program for managing virtual machines.

In some embodiments, writing the new representation to the persistent storage may be responsive to determining that the matching representation is not found.

In some embodiments, the software application may have access to definitions of a plurality of identification conditions that have respective priorities, each identification condition of the plurality indicating a respective subset of the configuration-element attributes that can be used to identify configuration elements, where the information from the module contains values for a group of configuration-element attributes from the set, and where the software application may be further configured to: before the search, analyze the plurality of identification conditions, in order of the priorities, in attempt to find a matching identification condition, where the matching identification condition is found when the respective subset indicated by the matching identification condition includes at least the configuration-element attributes of the group; based on the analyzing, make a determination that the matching identification condition is found, where the matching identification condition that is found is the identification condition that indicates the first subset; and in response to making the determination, use the exception and the identification condition that indicates the first subset as basis to carry out the search.

In such embodiments, the software application may be further configured to: after determining that the matching representation is not found, continue to analyze the plurality of identification conditions, in order of the priorities, in attempt to find a second matching identification condition; and based on the continued analyzing, make a further determination that the second matching identification condition is not found, where writing the new representation to the persistent storage is responsive to making the further determination.

Additionally or alternatively, in such embodiments, the software application may be further configured to: after determining that the matching representation is not found, continue to analyze the plurality of identification conditions, in order of the priorities, in attempt to find a second matching identification condition; based on the continued analyzing, make a further determination that the second matching identification condition is found; and in response to making the further determination, use the second matching identification condition and the exception as basis to carry out an additional search for the matching representation, where, during the additional search, the matching representation is found when one of the representations and the information contain identical values for all of the configuration-element attributes in the respective subset indicated by the second matching identification condition excluding those also in the second subset.

In some embodiments, the software application may have access to definitions of a plurality of identification conditions that have respective priorities, each identification condition of the plurality indicating a respective subset of the configuration-element attributes that can be used to identify configuration elements, and the software application may be further configured to: receive, from the module, second information that represents a second part of the configuration of the computing device, where the second information from the module contains values for a group of configuration-element attributes from the set; analyze the plurality of identification conditions, in order of the priorities, in attempt to find a matching identification condition, where the matching identification condition is found when the respective subset indicated by the matching identification condition includes at least the configuration-element attributes of the group; based on the analyzing, make a determination that the matching identification condition is not found; and in response to making the determination, write, to the persistent storage, a second new representation of a second configuration element, where the second new representation specifies values for at least the configuration-element attributes of the group according to the second information from the module.

In some embodiments, the software application may be further configured to: receive, from the module, second information that represents a second part of the configuration of the computing device; based on the identification condition and the exception, further search the representations of configuration elements in the persistent storage in attempt to find a second matching representation that characterizes the second information from the module, where the second matching representation is found when one of the representations and the second information contain identical values for all of the configuration-element attributes in the first subset excluding those also in the second subset; based on the further search, determine that the second matching representation is found in the persistent storage; and write, to the second matching representation in the persistent storage, values for at least some of the configuration-element attributes of the set according to the second information from the module.

In such embodiments, the software application may have access to definitions of a plurality of identification conditions that have respective priorities, each identification condition of the plurality indicating a respective subset of the configuration-element attributes that can be used to identify configuration elements, where the second information from the module contains values for a group of configuration-element attributes from the set, and where the software application may be further configured to: before the further search, analyze the plurality of identification conditions, in order of the priorities, in attempt to find a matching identification condition, where the matching identification condition is found when the respective subset indicated by the matching identification condition includes at least the configuration-element attributes of the group; based on the analyzing, make a determination that the matching identification condition is found, where the matching identification condition that is found is the identification condition that indicates the first subset; and in response to making the determination, use the exception and the identification condition that indicates the first subset as basis to carry out the further search. Other embodiments are also possible with respect to the flow chart illustrated in FIG. 9.

FIG. 10 is another flow chart illustrating an example embodiment. The process illustrated by FIG. 10 may be carried out by a computing system, such as computing device 100, and/or a cluster of computing devices, such as server cluster 200. However, the process can be carried out by other types of devices or device subsystems. For example, the process could be carried out by a portable computer, such as a laptop or a tablet device. In another example, the process could be carried out by any system or device that executes or otherwise has software application 608 deployed thereon.

The embodiments of FIG. 10 may be simplified by the removal of any one or more of the features shown therein. Further, these embodiments may be combined with features, aspects, and/or implementations of any of the previous figures or otherwise described herein.

Block 1000 may involve, based on an identification condition and an exception, searching, by a software application, representations of configuration elements in a persistent storage in attempt to find a matching representation that also characterizes a particular representation, where the representations are of configuration elements discovered within a managed network, where each of the representations respectively specifies values for at least some of a set of configuration-element attributes, where the representations include the particular representation, where the particular representation specifies values according to information received from a module associated with a computing device disposed within the managed network, the information received from the module representing a part of a configuration of the computing device, where the software application has access to definitions of the identification condition and the exception, where the identification condition indicates a first subset of the configuration-element attributes that can be used to identify configuration elements, where the exception indicating a second subset of the configuration-element attributes that the module does not support, and where the matching representation is found when one of the representations and the information from the module contain identical values for all of the configuration-element attributes in the first subset excluding those also in the second subset.

Block 1002 may involve, based on the search, determining, by the software application, that the matching representation is found.

Block 1004 may involve merging, by the software application, the particular representation and the matching representation into a combined representation in the persistent storage, where the combined representation specifies (i) at least some of the values that were specified in the matching representation and (ii) at least some of the values that were specified in the particular representation.

In some embodiments, the module may be a software agent, a network monitoring tool, or a computer program for managing virtual machines.

In some embodiments, merging the particular representation and the matching representation into the combined representation in the persistent storage may be responsive to determining that the matching representation is found.

In some embodiments, the particular representation may include a mark indicating that a source of the values specified by the particular representation is the module, and the software application may be further configured to: determine that the particular representation includes the mark, and responsively carry out the search.

In some embodiments, the software application may have access to definitions of a plurality of identification conditions that have respective priorities, each identification condition of the plurality indicating a respective subset of the configuration-element attributes that can be used to identify configuration elements, where the information from the module contains values for a group of configuration-element attributes from the set, and where the software application may be further configured to: before the search, analyze the plurality of identification conditions, in order of the priorities, in attempt to find a matching identification condition, where the matching identification condition is found when the respective subset indicated by the matching identification condition includes at least the configuration-element attributes of the group; based on the analyzing, make a determination that the matching identification condition is found, where the matching identification condition that is found is the identification condition that indicates the first subset; and in response to making the determination, use the exception and the identification condition that indicates the first subset as basis to carry out the search.

In such embodiments, the particular representation may include a mark indicating that a source of the values specified by the particular representation is the module, and the software application may be further configured to: determine that the particular representation includes the mark, and responsively carry out the analyzing.

In some embodiments, the representations may include a second representation that specifies values according to second information received from the module, the second information representing a second part of the configuration of the computing device, where the software application may be further configured to: based on the identification condition and the exception, further search the representations of configuration elements in the persistent storage in attempt to find a second matching representation that also characterizes the second information from the module, where the second matching representation is found when one of the representations and the second information from the module contain identical values for all of the configuration-element attributes in the first subset excluding those also in the second subset; based on the further search, determine that the second matching representation is not found; and maintain the second representation in the persistent storage.

In such embodiments, maintaining the second representation in the persistent storage may be responsive to determining that the second matching representation is not found.

Additionally or alternatively, in such embodiments, the software application may have access to definitions of a plurality of identification conditions that have respective priorities, each identification condition of the plurality indicating a respective subset of the configuration-element attributes that can be used to identify configuration elements, where the second information from the module contains values for a group of configuration-element attributes from the set, and where the software application may be further configured to: before the further search, analyze the plurality of identification conditions, in order of the priorities, in attempt to find a matching identification condition, where the matching identification condition is found when the respective subset indicated by the matching identification condition includes at least the configuration-element attributes of the group; based on the analyzing, make a determination that the matching identification condition is found, where the matching identification condition that is found is the identification condition that indicates the first subset; and in response to making the determination, use the exception and the identification condition that indicates the first subset as basis to carry out the further search.

In this regard, the software application may be further configured to: after determining that the second matching representation is not found, continue to analyze the plurality of identification conditions, in order of the priorities, in attempt to find a second matching identification condition; and based on the continued analyzing, make a further determination that the second matching identification condition is not found, where maintaining the second representation in the persistent storage is responsive to making the further determination.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
persistent storage that contains representations of configuration elements discovered within a managed network, wherein each of the representations respectively specifies values for at least some of a set of configuration-element attributes, and wherein a module is associated with a computing device disposed within the managed network; and
a software application that has access to definitions of: (i) an identification condition that indicates a first subset of the configuration-element attributes that can be used to identify configuration elements, and (ii) an exception indicating a second subset of the configuration-element attributes that the module does not support, wherein the software application is configured to:
determine a third subset of the configuration-element attributes that the module does support as the configuration-element attributes of the first subset excluding the configuration-element attributes of the second subset;
receive, from the module, information that represents a part of a configuration of the computing device;
search the representations of configuration elements in the persistent storage to find a matching representation that characterizes the information from the module, wherein the matching representation is found when one of the representations and the information from the module contain identical values for all of the configuration-element attributes in the third subset;
based on the search, determine that the matching representation is not found; and write, to the persistent storage, a new representation of a configuration element, wherein the new representation specifies values for at least some of the configuration-element attributes of the set according to the information from the module.

2. The computing system of claim 1, wherein the module is a software agent, a network monitoring tool, or a computer program for managing virtual machines.

3. The computing system of claim 1, wherein writing the new representation to the persistent storage is responsive to determining that the matching representation is not found.

4. The computing system of claim 1, wherein the software application has access to definitions of a plurality of identification conditions that have respective priorities, each identification condition of the plurality indicating a respective subset of the configuration-element attributes that can be used to identify configuration elements, wherein the information from the module contains values for a group of configuration-element attributes from the set, and wherein the software application is configured to:
- before the search, analyze the plurality of identification conditions, in order of the priorities, to find a matching identification condition, wherein the matching identification condition is found when the respective subset indicated by the matching identification condition includes at least the configuration-element attributes of the group;
- based on the analyzing, make a determination that the matching identification condition is found, wherein the matching identification condition that is found is the identification condition that indicates the first subset; and
- in response to making the determination, use the exception and the identification condition that indicates the first subset as basis to carry out the search.

5. The computing system of claim 4, wherein the software application is configured to:
- after determining that the matching representation is not found, continue to analyze the plurality of identification conditions, in order of the priorities, to find a second matching identification condition; and
- based on the continued analyzing, make a further determination that the second matching identification condition is not found,
- wherein writing the new representation to the persistent storage is responsive to making the further determination.

6. The computing system of claim 4, wherein the software application is configured to:
- after determining that the matching representation is not found, continue to analyze the plurality of identification conditions, in order of the priorities, to find a second matching identification condition;
- based on the continued analyzing, make a further determination that the second matching identification condition is found; and
- in response to making the further determination, use the second matching identification condition and the exception as basis to carry out an additional search for the matching representation, wherein, during the additional search, the matching representation is found when one of the representations and the information contain identical values for all of the configuration-element attributes in the respective subset indicated by the second matching identification condition excluding those also in the second subset.

7. The computing system of claim 1, wherein the software application has access to definitions of a plurality of identification conditions that have respective priorities, each identification condition of the plurality indicating a respective subset of the configuration-element attributes that can be used to identify configuration elements, and wherein the software application is configured to:
- receive, from the module, second information that represents a second part of the configuration of the computing device, wherein the second information from the module contains values for a group of configuration-element attributes from the set;
- analyze the plurality of identification conditions, in order of the priorities, to find a matching identification condition, wherein the matching identification condition is found when the respective subset indicated by the matching identification condition includes at least the configuration-element attributes of the group;
- based on the analyzing, make a determination that the matching identification condition is not found; and
- in response to making the determination, write, to the persistent storage, a second new representation of a second configuration element, wherein the second new representation specifies values for at least the configuration-element attributes of the group according to the second information from the module.

8. The computing system of claim 1, wherein the software application is configured to:
- receive, from the module, second information that represents a second part of the configuration of the computing device;
- further search the representations of configuration elements in the persistent storage to find a second matching representation that characterizes the second information from the module, wherein the second matching representation is found when one of the representations and the second information contain identical values for all of the configuration-element attributes in the third subset;
- based on the further search, determine that the second matching representation is found in the persistent storage; and
- write, to the second matching representation in the persistent storage, values for at least some of the configuration-element attributes of the set according to the second information from the module.

9. The computing system of claim 8, wherein the software application has access to definitions of a plurality of identification conditions that have respective priorities, each identification condition of the plurality indicating a respective subset of the configuration-element attributes that can be used to identify configuration elements, wherein the second information from the module contains values for a group of configuration-element attributes from the set, and wherein the software application is configured to:
- before the further search, analyze the plurality of identification conditions, in order of the priorities, to find a matching identification condition, wherein the matching identification condition is found when the respective subset indicated by the matching identification condition includes at least the configuration-element attributes of the group;
- based on the analyzing, make a determination that the matching identification condition is found, wherein the matching identification condition that is found is the identification condition that indicates the first subset; and in response to making the determination, use the exception and the identification condition that indicates the first subset as basis to carry out the further search.

10. A method comprising:

receiving, by a software application and from a module, information that represents a part of a configuration of a computing device disposed within a managed network, wherein the module is associated with the computing device, wherein the software application is part of a computing system including persistent storage that contains representations of configuration elements discovered within the managed network, wherein each of the representations respectively specifies values for at least some of a set of configuration-element attributes, and wherein the software application has access to definitions of: (i) an identification condition that indicates a first subset of the configuration-element attributes that can be used to identify configuration elements, and (ii) an exception indicating a second subset of the configuration-element attributes that the module does not support;

determining, by the software application, a third subset of the configuration-element attributes that the module does support as the configuration-element attributes of the first subset excluding the configuration-element attributes of the second subset;

searching, by the software application, the representations of configuration elements in the persistent storage to find a matching representation that characterizes the information from the module, wherein the matching representation is found when one of the representations and the information from the module contain identical values for all of the configuration-element attributes in the third subset;

based on the search, determining, by the software application, that the matching representation is not found; and writing, by the software application and to the persistent storage, a new representation of a configuration element, wherein the new representation specifies values for at least some of the configuration-element attributes of the set according to the information from the module.

11. A computing system comprising:

persistent storage that contains representations of configuration elements discovered within a managed network, wherein each of the representations respectively specifies values for at least some of a set of configuration-element attributes, and wherein the representations include a particular representation that specifies values according to information received from a module associated with a computing device disposed within the managed network, the information received from the module representing a part of a configuration of the computing device; and a software application that has access to definitions of: (i) an identification condition that indicates a first subset of the configuration-element attributes that can be used to identify configuration elements, and (ii) an exception indicating a second subset of the configuration-element attributes that the module does not support, wherein the software application is configured to:

determine a third subset of the configuration-element attributes that the module does support as the configuration-element attributes of the first subset excluding the configuration-element attributes of the second subset;

search the representations of configuration elements in the persistent storage to find a matching representation that also characterizes the particular representation, wherein the matching representation is found when one of the representations and the information from the module contain identical values for all of the configuration-element attributes in the third subset;

based on the search, determine that the matching representation is found; and merge the particular representation and the matching representation into a combined representation in the persistent storage, wherein the combined representation specifies (i) at least some of the values that were specified in the matching representation and (ii) at least some of the values that were specified in the particular representation.

12. The computing system of claim 11, wherein the module is a software agent, a network monitoring tool, or a computer program for managing virtual machines.

13. The computing system of claim 11, wherein merging the particular representation and the matching representation into the combined representation in the persistent storage is responsive to determining that the matching representation is found.

14. The computing system of claim 11, wherein the particular representation includes a mark indicating that a source of the values specified by the particular representation is the module, and wherein the software application is configured to:

determine that the particular representation includes the mark, and responsively carry out the search.

15. The computing system of claim 11, wherein the software application has access to definitions of a plurality of identification conditions that have respective priorities, each identification condition of the plurality indicating a respective subset of the configuration-element attributes that can be used to identify configuration elements, wherein the information from the module contains values for a group of configuration-element attributes from the set, and wherein the software application is configured to:

before the search, analyze the plurality of identification conditions, in order of the priorities, to find a matching identification condition, wherein the matching identification condition is found when the respective subset indicated by the matching identification condition includes at least the configuration-element attributes of the group;

based on the analyzing, make a determination that the matching identification condition is found, wherein the matching identification condition that is found is the identification condition that indicates the first subset; and in response to making the determination, use the exception and the identification condition that indicates the first subset as basis to carry out the search.

16. The computing system of claim 15, wherein the particular representation includes a mark indicating that a source of the values specified by the particular representation is the module, and wherein the software application is configured to:

determine that the particular representation includes the mark, and responsively carry out the analyzing.

17. The computing system of claim 11, wherein the representations include a second representation that specifies values according to second information received from the module, the second information representing a second part of the configuration of the computing device, and wherein the software application is configured to:

further search the representations of configuration elements in the persistent storage to find a second matching representation that also characterizes the second information from the module, wherein the second matching representation is found when one of the representations and the second information from the module contain identical values for all of the configuration-element attributes in the third subset;

based on the further search, determine that the second matching representation is not found; and maintain the second representation in the persistent storage.

18. The computing system of claim 17, wherein maintaining the second representation in the persistent storage is responsive to determining that the second matching representation is not found.

19. The computing system of claim 17, wherein the software application has access to definitions of a plurality of identification conditions that have respective priorities, each identification condition of the plurality indicating a respective subset of the configuration-element attributes that can be used to identify configuration elements, wherein the second information from the module contains values for a group of configuration-element attributes from the set, and wherein the software application is configured to:

before the further search, analyze the plurality of identification conditions, in order of the priorities, to find a matching identification condition, wherein the matching identification condition is found when the respective subset indicated by the matching identification condition includes at least the configuration-element attributes of the group;

based on the analyzing, make a determination that the matching identification condition is found, wherein the matching identification condition that is found is the identification condition that indicates the first subset; and in response to making the determination, use the exception and the identification condition that indicates the first subset as basis to carry out the further search.

20. The computing system of claim 19, wherein the software application is configured to:

after determining that the second matching representation is not found, continue to analyze the plurality of identification conditions, in order of the priorities, to find a second matching identification condition; and based on the continued analyzing, make a further determination that the second matching identification condition is not found, wherein maintaining the second representation in the persistent storage is responsive to making the further determination.

* * * * *